US011328502B2

(12) United States Patent
Ding et al.

(10) Patent No.: US 11,328,502 B2
(45) Date of Patent: May 10, 2022

(54) VISUALIZED TIME SEQUENCE PATTERN MATCHING METHOD FOR DATA VISUALIZATION ANALYSIS BASED ON HOUGH TRANSFORMATION

(71) Applicant: Northeastern University, Shenyang (CN)

(72) Inventors: Jinliang Ding, Shenyang (CN); Quan Xu, Shenyang (CN); Meirong Xu, Shenyang (CN); Xiaoran Yu, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 13 days.

(21) Appl. No.: 16/960,483

(22) PCT Filed: Apr. 12, 2019

(86) PCT No.: PCT/CN2019/082423
§ 371 (c)(1),
(2) Date: Jul. 7, 2020

(87) PCT Pub. No.: WO2020/199241
PCT Pub. Date: Oct. 8, 2020

(65) Prior Publication Data
US 2021/0117715 A1    Apr. 22, 2021

(30) Foreign Application Priority Data

Apr. 4, 2019    (CN) .......................... 201910272006.7

(51) Int. Cl.
*G06V 10/75*    (2022.01)
*G06K 9/62*    (2022.01)

(52) U.S. Cl.
CPC ......... *G06V 10/753* (2022.01); *G06K 9/6215* (2013.01)

(58) Field of Classification Search
None
See application file for complete search history.

(56) References Cited

U.S. PATENT DOCUMENTS 9,563,696 B2 *  2/2017  Bastiaens ............. G06F 16/583
9,965,722 B2 *  5/2018  Ding ..................... G05B 13/04
(Continued)

FOREIGN PATENT DOCUMENTS

CN      1685359 A   10/2005
CN    105046684 A   11/2015
(Continued)

OTHER PUBLICATIONS

Tollefson J, Frickel S, Restrepo MI (2021) Feature extraction and machine learning techniques for identifying historic urban environmental hazards: New methods to locate lost fossil fuel infrastructure in US cities. PLoS ONE 16(8): e0255507. https://doi.org/10.1371/journal.pone.0255507 (Year: 2021).*

Primary Examiner — Tahmina N Ansari
(74) Attorney, Agent, or Firm — Muncy, Geissler, Olds & Lowe, P.C.

(57) ABSTRACT

The invention provides a visualized time sequence pattern matching method based on Hough transformation, and relates to the technical field of data visualization analysis. The method comprises the steps of: firstly, judging whether historical data to be matched is one-dimensional time sequence data or multi-dimensional time sequence data, and if the historical data to be matched is the multi-dimensional time sequence data, performing normalization processing; performing time sequence selection: selecting a time sequence to be matched from the historical data in a time window pattern, and eliminating the selected time sequence from the historical data; converting a time sequence image in original coordinates to Hough space through the Hough transformation, and judging the similarity matching situa- (Continued)

tion of the time sequence through a voting mechanism; and finally, screening the finally-matched results according to the voting results.

5 Claims, 5 Drawing Sheets

(56) References Cited

U.S. PATENT DOCUMENTS

| | | | | |
|---|---|---|---|---|
| 2014/0294236 A1* | 10/2014 | Biller | ............... | G06V 30/40 |
| | | | | 382/103 |
| 2016/0364649 A1* | 12/2016 | Ding | ............... | G05B 19/05 |
| 2019/0035431 A1* | 1/2019 | Attorre | ............ | G11B 27/036 |
| 2021/0117715 A1* | 4/2021 | Ding | ............... | G06K 9/0055 |

FOREIGN PATENT DOCUMENTS

| | | |
|---|---|---|
| CN | 106936964 A | 7/2017 |
| CN | 109241077 A | 1/2019 |
| CN | 109241190 A | 1/2019 |
| CN | 109409639 A | 3/2019 |
| EP | 2960806 A1 | 12/2015 |

\* cited by examiner

VISUALIZED TIME SEQUENCE PATTERN MATCHING METHOD FOR DATA VISUALIZATION ANALYSIS BASED ON HOUGH TRANSFORMATION

BACKGROUND OF THE INVENTION

1. Field of the Invention

The invention relates to the technical field of data visualization analysis, in particular to a visualized time sequence pattern matching method based on Hough transformation.

2. The Prior Arts

Most of industrial production data is time sequence data, with the development of industrial informationization, a decision maker hopes that the industrial production data can be presented in a more intuitive and effective manner so as to conveniently assist in decision making, visualization analysis of the time sequence data is an important technical means for realizing the prospect, and pattern matching is emphasis in the process of performing visualization analysis on the industrial data. Hough transformation as a pattern matching method based on shape is also suitable for the industrial data visualization field which pays attention to the production data running trend. The following is a case of applying the Hough transformation as the pattern matching method in the past. In Chinese patent publication No. 106936964A, Hough transformation template matching is used in cell phone screen corner point detection, in Chinese patent publication No. 105046684A, an image matching method based on polygon generalized Hough transformation is used for real-time positioning of objects, the above methods are applications of the Hough transformation, but are not specific to similarity matching, and are not suitable for being directly applied for solving the problem of real-time data similarity matching in the industry.

SUMMARY OF THE INVENTION

The invention aims to solve the technical problem of providing a visualized time sequence pattern matching method based on Hough transformation to realize visualization matching of one-dimensional or multi-dimensional time sequence data similarity in accordance with the deficiencies existing in the prior art.

In order to solve the technical problem, the technical scheme adopted by the visualized time sequence pattern matching method disclosed by the invention lies in that the visualized time sequence pattern matching method based on Hough transformation comprises the following steps:

Step 1, judging whether historical data to be matched is one-dimensional time sequence data or multi-dimensional time sequence data, if the historical data to be matched is the one-dimensional time sequence data, directly performing step 2, if the historical data to be matched is the multi-dimensional time sequence data, performing normalization processing on the time sequence data, and then performing the step 2;

Step 2, performing time sequence selection: selecting a time sequence to be matched from the historical data in a time window pattern, and eliminating the selected time sequence from the historical data so as to conveniently match similar time sequence data from the remaining historical data, Wherein if the historical data is one-dimensional time sequence data History[i], i is a time sequence value and meets $0 \leq i \leq History.length-1$, History.length is a length of the historical data, the selected time sequence to be matched is Query[j], a length of the selected time sequence to be matched is Range, $0 \leq j < Range$ and Range=QueryMax−QueryMin, and QueryMax and QueryMin are respectively a termination point and a starting point of the time sequence to be matched, after the selected matched time sequence is eliminated from the historical data, the length of the remaining time sequence is History.length−Range; and If the historical data is multi-dimensional time sequence data History'[dim][i], dim is different dimension indexes, i is a time sequence value, History'[0].length is a length of the zero-dimensional historical data and meets $0 \leq i \leq History'[0].length-1$, the time sequence to be matched is Query'[dim][j], a length of the time sequence to be matched is Range, $0 \leq j < Range$ and Range=QueryMax−QueryMin, and QueryMax and QueryMin are respectively a termination point and a starting point of the time sequence to be matched, after the selected matched time sequence is eliminated from the historical data, the length of the remaining time sequence is History'[0].length−Range;

Step 3, converting a time sequence image in original coordinates to a Hough space through the Hough transformation, and judging the similarity matching situation of the time sequence through a voting mechanism, Wherein the Hough transformation comprises three parts: data pool updating, projection of XY axes to the Hough space, and voting, A specific method of the data pool updating comprises the steps: when a time sequence having similar data with the time sequence to be matched is matched in the historical data, the matched time sequence is eliminated from the historical data so as to realize the data pool updating;

If the historical data is the one-dimensional time sequence data, when the n-th similar time sequence is matched, the length of the remaining time sequence in the historical data is as shown in the following formula:

$$History.length=History.length-(n+1)*Range;$$

If the historical data is the multi-dimensional time sequence data, when the n-th similar time sequence is matched, the length of the remaining time sequence in the historical data is as shown in the following formula:

$$History'[dim].length=History'[dim].length-(n+1)*Range;$$

A specific method of the projection of XY axes to the Hough space comprises the following steps of:

Step C1, finding out the X axis starting point StartSearch of the historical data to be matched this time, setting t=StartSearch, and determining the termination point EndSearch of the historical data to be matched this time;

Step C2, setting m=QueryMin; and

Step C3, projecting an X axis of the historical data to the Hough space,

Wherein if the historical data is the one-dimensional time sequence data, a projection formula is as follows:

$$hx=Math.floor\{[History[t].time+Range/2-(m-QueryMin)]*Xscale\},$$

hx is an X coordinate projected to the Hough space, Xscale is an X axis voting proportional scale, and Math.floor is a rounding down calculation; and If the historical data is the multi-dimensional time sequence data, a projection formula is as follows:

$hx=\text{Math.floor}\{[\text{History}[0][t].\text{time}+\text{Range}/2-(m-\text{QueryMin})]*\text{Xscale}\};$ Step C4, projecting a Y axis of the historical data to the Hough space, and needing to figure out a difference value between a data to be matched and the historical data for unit Y axis projection, Wherein if the historical data is the one-dimensional time sequence data, a projection formula is as follows:

$hy=\text{Math.floor}\{[\text{Query}[m-\text{QueryMin}].\text{value}-\text{History}[t].\text{value}]*\text{Yscale}\},$ wherein Yscale is a Y axis voting proportional scale, hy is a Y coordinate projected to the Hough space, Query[m−QueryMin].value is a value of a one-dimensional time sequence at time m−QueryMin, and History[t].value is a value of a one-dimensional historical time sequence at time t; and If the historical data is the multi-dimensional time sequence data, a projection formula is as follows:

$$hy = \text{Math.floor}\left\{\left[\sum_{dim=1}^{K} \text{Query}[dim][m - \text{QueryMin}].\text{value} - \sum_{dim=1}^{K} \text{History}[dim][t].\text{value}\right] * \text{Yscale}\right\},$$

wherein K is a historical data dimension;

Step C5, performing voting to obtain a corresponding time sequence when the largest number of votes under [hx][hy] coordinates is obtained, wherein a specific method comprises the steps of:

Step C5.1, setting a voting principle: giving one vote under the condition of the same X axis difference value and the same Y axis difference value, namely Vote[hx][hy]++, wherein Vote is the number of votes obtained under the [hx][hy] coordinates;

Step C5.2, if the count of votes obtained under the [hx][hy] coordinates is MMax<Vote[hx][hy], enabling:

MMax=Vote[hx][hy], MMaxT=History[t].time,

Wherein MMax is the count of votes obtained under the [hx][hy] coordinates, MMaxT is a corresponding time sequence when the number of votes MMax is obtained;

Step C6, m++, re-performing steps C3-C5, until m=QueryMax; and

Step C7, t++, re-performing steps C2-C6, until t=EndSearch; and

Step 4, performing screening: finding out the most similar group of time sequences according to the voting result MMax, outputting MMaxT to obtain the positions of the time sequences in the historical data, deleting the time sequences from the positions of the time sequences in the historical data, enabling n+1, and from the step 3, performing a next-round voting calculation until matching of all the historical data is completed.

The visualized time sequence pattern matching method adopting the technical scheme has the beneficial effects that according to the visualized time sequence pattern matching method based on Hough transformation provided by the invention, a time sequence image in original coordinates is converted to the Hough space through the Hough transformation, and the similarity matching situation of the time sequence is judged through the voting mechanism. The method is easy to realize, simple and effective, the running efficiency of an algorithm is high, and the method can be applied to the field of industrial real-time data visualization to be used for realizing visualized basic functions of finding out similar time sequences and the like.

BRIEF DESCRIPTION OF DRAWINGS

FIGS. 2a and 2b are a matching effect diagram of a one-dimensional time sequence pattern provided by the embodiment of the invention, wherein FIGS. 3a and 3b are a matching effect diagram of a multi-dimensional time sequence pattern provided by the embodiment of the invention, wherein

DETAILED DESCRIPTION OF THE PREFERRED EMBODIMENT

The detailed description of the invention is further elaborated in combination with the drawings and the embodiment. The following embodiment is used to illustrate the invention, but is not intended to limit the scope of the invention.

Figure 1:
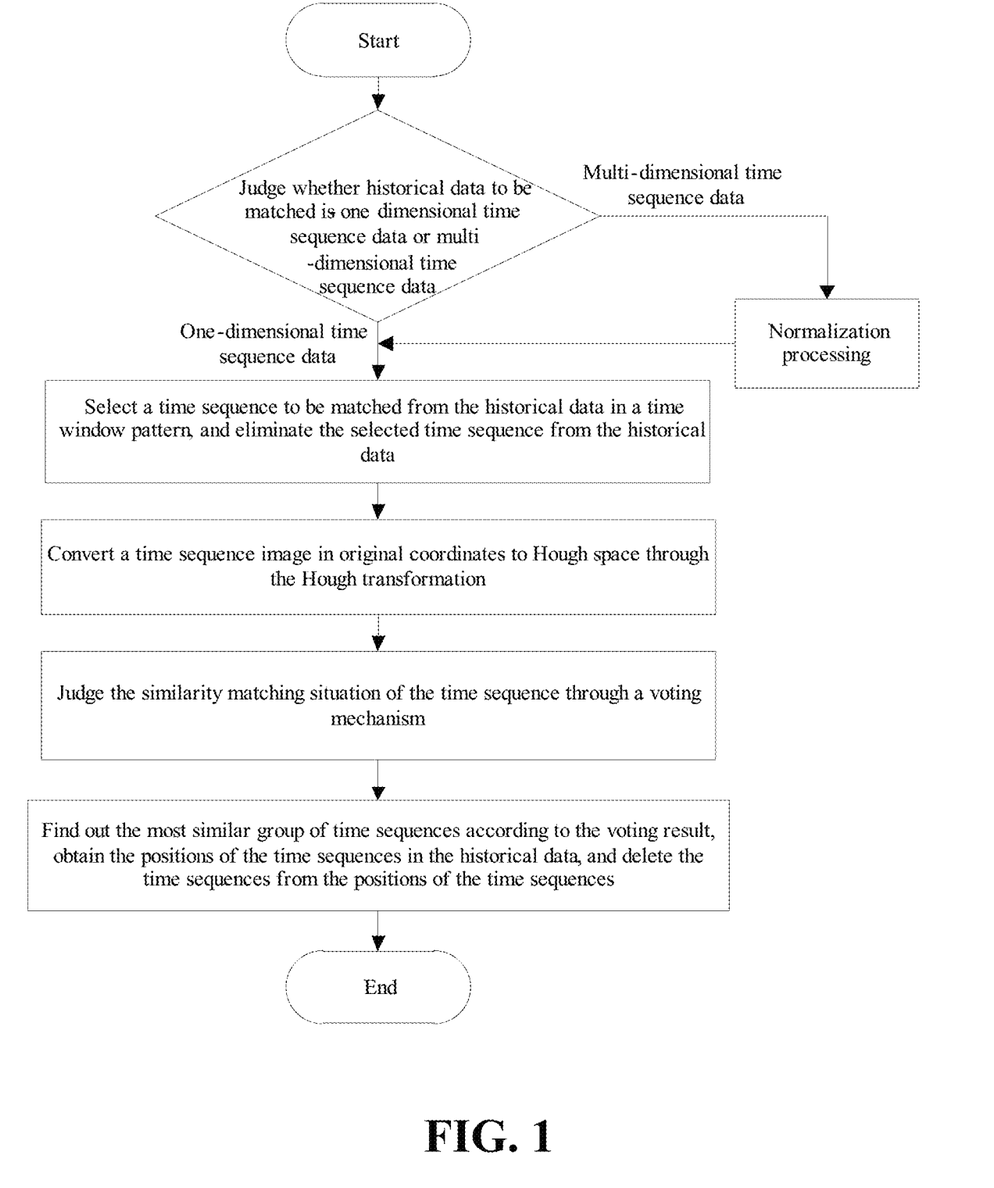
FIG. 1 is a flow diagram of a visualized time sequence pattern matching method based on Hough transformation provided by the embodiment of the invention.

A visualized time sequence pattern matching method based on Hough transformation, as shown in FIG. 1, comprises the following steps:

Step 1, judging whether historical data to be matched is one-dimensional time sequence data or multi-dimensional time sequence data, if the historical data to be matched is the one-dimensional time sequence data, directly performing step 2, if the historical data to be matched is the multi-dimensional time sequence data, performing normalization processing on the time sequence data, and then performing the step 2;

Step 2, performing time sequence selection: selecting a time sequence to be matched from the historical data in a time window pattern, and eliminating the selected time sequence from the historical data so as to conveniently match similar time sequence data from the remaining historical data, Wherein if the historical data is one-dimensional time sequence data History[i], i is a time sequence value and meets 0≤i≤History.length−1, History.length is a length of the historical data, the selected time sequence to be matched is Query[j], a length of the selected time sequence to be matched is Range, 0≤j<Range and Range=QueryMax−QueryMin, and QueryMax and QueryMin are respectively a termination point and a starting point of the time sequence to be matched, after the selected matched time sequence is eliminated from the historical data, the length of the remaining time sequence is History.length−Range; and If the historical data is multi-dimensional time sequence data History'[dim][i], dim is different dimension indexes, i is a time sequence value, History'[0].length is a length of zero-dimensional historical data and meets 0≤i≤History'[0].length−1, the time sequence to be matched is Query'[dim][j], a length of the time sequence to be matched is Range, 0≤j<Range and Range=QueryMax−QueryMin, QueryMax and QueryMin are respectively a termination point and a starting point of the time sequence to be matched, after the selected matched time sequence is eliminated from the historical data, the length of the remaining time sequence is History'[0].length−Range;

Step 3, converting a time sequence image in original coordinates to a Hough space through the Hough transformation, and judging the similarity matching situation of the time sequence through a voting mechanism, wherein the Hough transformation comprises three parts: data pool updating, projection of XY axes to the Hough space, and voting, A specific method of the data pool updating comprises the steps: when a time sequence having similar data with the time sequence to be matched is matched in the historical data, the matched time sequence is eliminated from the historical data so as to realize data pool updating;

If the historical data is the one-dimensional time sequence data, when the n-th similar time sequence is matched, the length of the remaining time sequence in the historical data is as shown in the following formula:

History.length=History.length−(n+1)*Range;

If the historical data is the multi-dimensional time sequence data, when the n-th similar time sequence is matched, the length of the remaining time sequence in the historical data is as shown in the following formula:

History'[dim].length=History'[dim].length−(n+1)*Range;

A specific method of the projection of XY axes to the Hough space comprises the following steps of:

Step C1, finding out the X axis starting point StartSearch of the historical data to be matched this time, setting t=StartSearch, and determining the termination point EndSearch of the historical data to be matched this time;

Step C2, setting m=QueryMin; and

Step C3, projecting an X axis of the historical data to the Hough space,

Wherein if the historical data is the one-dimensional time sequence data, a projection formula is as follows:

hx=Math.floor{[History[t].time+Range/2−(m−QueryMin)]*Xscale}, hx is an X coordinate projected to the Hough space, Xscale is an X axis voting proportional scale, and Math.floor is a rounding down calculation; and If the historical data is the multi-dimensional time sequence data, a projection formula is as follows:

hx=Math.floor{[History[0][t].time+Range/2−(m−QueryMin)]*Xscale};

Step C4, projecting a Y axis to the Hough space, and needing to figure out a difference value between a data to be matched and the historical data for unit Y axis projection, Wherein if the historical data is the one-dimensional time sequence data, a projection formula is as follows:

hy=Math.floor{[Query[m−QueryMin].value−History[t].value]*Yscale}, wherein Yscale is a Y axis voting proportional scale, hy is a Y coordinate projected to the Hough space, Query[m−QueryMin].value is a value of a one-dimensional time sequence at time m−QueryMin, and History[t].value is a value of a one-dimensional historical time sequence at time t; and If the historical data is the multi-dimensional time sequence data, a projection formula is as follows:

$$hy = \text{Math.floor}\left\{\left[\sum_{dim=1}^{K} \text{Query}[dim][m-QueryMin].\text{value} - \sum_{dim=1}^{K} \text{History}[dim][t].\text{value}\right] * Yscale\right\},$$

Wherein K is a historical data dimension;

Step C5, performing voting to obtain a corresponding time sequence when the largest number of votes under [hx][hy] coordinates is obtained, wherein a specific method comprises the steps of:

Step C5.1, setting a voting principle: giving one vote under the condition of the same X axis difference value and the same Y axis difference value namely Vote[hx][hy]++, wherein Vote is the number of votes obtained under the [hx][hy] coordinates;

Step C5.2, if MMax<Vote[hx][hy], enabling:

MMax=Vote[hx][hy], MMaxT=History[t].time,

Wherein MMax is the count of votes obtained under the [hx][hy] coordinates, MMaxT is a corresponding time sequence when the number of votes MMax is obtained;

Step C6, m++, re-performing steps C3-C5, until m=QueryMax; and

Step C7, t++, re-performing steps C2-C6, until t=EndSearch; and

Step 4, performing screening: finding out the most similar group of time sequences according to the voting result MMax, outputting MMaxT to obtain the positions of the time sequences in the historical data, deleting the time sequences from the positions of the time sequences, enabling n+1, and from the step 3, performing a next-round voting calculation until matching of all the historical data is completed.

Embodiment I

The production index data of ore separation enterprises is typical time sequence data, the embodiment takes common production indexes in the ore separation enterprises as an example, and a visualized time sequence pattern matching method based on Hough transformation disclosed by the invention is used for matching the production index data of the enterprises.

The ore separation comprehensive refined yield (wet weight) indexes, comprehensive massive ore ratio indexes, powder 2# indexes and 2× refined 4# indexes of the ore separation enterprises are important production indexes, data is acquired at the frequency of 1 time per hour, and the obtained historical data of the ore separation comprehensive refined yield (wet weight) in two days is as shown in the following Table 1.

TABLE 1

Ore separation comprehensive refined yield (wet weight)

| Index ID | Index name | Sampling time | Data value (ton) |
|---|---|---|---|
| 1 | ore separation comprehensive refined yield (wet weight) | 2017-07-02 01:00:00 | 303.00 |
| 2 | ore separation comprehensive refined yield (wet weight) | 2017-07-02 02:00:00 | 247.00 |
| 3 | ore separation comprehensive refined yield (wet weight) | 2017-07-02 03:00:00 | 248.00 |

TABLE 1-continued

Ore separation comprehensive refined yield (wet weight)

| Index ID | Index name | Sampling time | Data value (ton) |
|---|---|---|---|
| 4 | ore separation comprehensive refined yield (wet weight) | 2017-07-02 04:00:00 | 260.00 |
| 5 | ore separation comprehensive refined yield (wet weight) | 2017-07-02 05:00:00 | 240.00 |
| 6 | ore separation comprehensive refined yield (wet weight) | 2017-07-02 06:00:00 | 247.00 |
| 7 | ore separation comprehensive refined yield (wet weight) | 2017-07-02 07:00:00 | 255.00 |
| 8 | ore separation comprehensive refined yield (wet weight) | 2017-07-02 08:00:00 | 262.00 |
| 9 | ore separation comprehensive refined yield (wet weight) | 2017-07-02 09:00:00 | 245.00 |
| 10 | ore separation comprehensive refined yield (wet weight) | 2017-07-02 10:00:00 | 283.00 |
| 11 | ore separation comprehensive refined yield (wet weight) | 2017-07-02 11:00:00 | 231.00 |
| 12 | ore separation comprehensive refined yield (wet weight) | 2017-07-02 12:00:00 | 251.00 |
| 13 | ore separation comprehensive refined yield (wet weight) | 2017-07-02 13:00:00 | 242.00 |
| 14 | ore separation comprehensive refined yield (wet weight) | 2017-07-02 14:00:00 | 290.00 |
| 15 | ore separation comprehensive refined yield (wet weight) | 2017-07-02 15:00:00 | 273.00 |
| 16 | ore separation comprehensive refined yield (wet weight) | 2017-07-02 16:00:00 | 279.00 |
| 17 | ore separation comprehensive refined yield (wet weight) | 2017-07-02 17:00:00 | 281.00 |
| 18 | ore separation comprehensive refined yield (wet weight) | 2017-07-02 18:00:00 | 234.00 |
| 19 | ore separation comprehensive refined yield (wet weight) | 2017-07-02 19:00:00 | 222.00 |
| 20 | ore separation comprehensive refined yield (wet weight) | 2017-07-02 20:00:00 | 202.00 |
| 21 | ore separation comprehensive refined yield (wet weight) | 2017-07-02 21:00:00 | 159.00 |
| 22 | ore separation comprehensive refined yield (wet weight) | 2017-07-02 22:00:00 | 147.00 |
| 23 | ore separation comprehensive refined yield (wet weight) | 2017-07-02 23:00:00 | 153.00 |
| 24 | ore separation comprehensive refined yield (wet weight) | 2017-07-03 00:00:00 | 217.00 |
| 25 | ore separation comprehensive refined yield (wet weight) | 2017-07-03 01:00:00 | 240.00 |
| 26 | ore separation comprehensive refined yield (wet weight) | 2017-07-03 02:00:00 | 250.00 |
| 27 | ore separation comprehensive refined yield (wet weight) | 2017-07-03 03:00:00 | 302.00 |
| 28 | ore separation comprehensive refined yield (wet weight) | 2017-07-03 04:00:00 | 255.00 |
| 29 | ore separation comprehensive refined yield (wet weight) | 2017-07-03 05:00:00 | 265.00 |
| 30 | ore separation comprehensive refined yield (wet weight) | 2017-07-03 06:00:00 | 247.00 |
| 31 | ore separation comprehensive refined yield (wet weight) | 2017-07-03 07:00:00 | 234.00 |
| 32 | ore separation comprehensive refined yield (wet weight) | 2017-07-03 08:00:00 | 294.00 |
| 33 | ore separation comprehensive refined yield (wet weight) | 2017-07-03 09:00:00 | 268.00 |
| 34 | ore separation comprehensive refined yield (wet weight) | 2017-07-03 10:00:00 | 275.00 |
| 35 | ore separation comprehensive refined yield (wet weight) | 2017-07-03 11:00:00 | 287.00 |
| 36 | ore separation comprehensive refined yield (wet weight) | 2017-07-03 12:00:00 | 237.00 |
| 37 | ore separation comprehensive refined yield (wet weight) | 2017-07-03 13:00:00 | 289.00 |
| 38 | ore separation comprehensive refined yield (wet weight) | 2017-07-03 14:00:00 | 216.00 |
| 39 | ore separation comprehensive refined yield (wet weight) | 2017-07-03 15:00:00 | 278.00 |
| 40 | ore separation comprehensive refined yield (wet weight) | 2017-07-03 16:00:00 | 303.70 |
| 41 | ore separation comprehensive refined yield (wet weight) | 2017-07-03 17:00:00 | 214.00 |
| 42 | ore separation comprehensive refined yield (wet weight) | 2017-07-03 18:00:00 | 258.00 |
| 43 | ore separation comprehensive refined yield (wet weight) | 2017-07-03 19:00:00 | 251.00 |
| 44 | ore separation comprehensive refined yield (wet weight) | 2017-07-03 20:00:00 | 203.00 |
| 45 | ore separation comprehensive refined yield (wet weight) | 2017-07-03 21:00:00 | 124.00 |
| 46 | ore separation comprehensive refined yield (wet weight) | 2017-07-03 22:00:00 | 201.00 |
| 47 | ore separation comprehensive refined yield (wet weight) | 2017-07-03 23:00:00 | 191.00 |
| 48 | ore separation comprehensive refined yield (wet weight) | 2017-07-04 00:00:00 | 137.00 |
| 49 | ore separation comprehensive refined yield (wet weight) | 2017-07-04 01:00:00 | 260.00 |
| 50 | ore separation comprehensive refined yield (wet weight) | 2017-07-04 02:00:00 | 250.00 |
| 51 | ore separation comprehensive refined yield (wet weight) | 2017-07-04 03:00:00 | 270.00 |
| 52 | ore separation comprehensive refined yield (wet weight) | 2017-07-04 04:00:00 | 299.00 |
| 53 | ore separation comprehensive refined yield (wet weight) | 2017-07-04 05:00:00 | 270.00 |
| 54 | ore separation comprehensive refined yield (wet weight) | 2017-07-04 06:00:00 | 284.00 |
| 55 | ore separation comprehensive refined yield (wet weight) | 2017-07-04 07:00:00 | 219.00 |
| 56 | ore separation comprehensive refined yield (wet weight) | 2017-07-04 08:00:00 | 157.46 |
| 57 | ore separation comprehensive refined yield (wet weight) | 2017-07-04 09:00:00 | 193.00 |
| 58 | ore separation comprehensive refined yield (wet weight) | 2017-07-04 10:00:00 | 107.15 |
| 59 | ore separation comprehensive refined yield (wet weight) | 2017-07-04 11:00:00 | 0.00 |
| 60 | ore separation comprehensive refined yield (wet weight) | 2017-07-04 12:00:00 | 0.00 |
| 61 | ore separation comprehensive refined yield (wet weight) | 2017-07-04 13:00:00 | 0.00 |
| 62 | ore separation comprehensive refined yield (wet weight) | 2017-07-04 14:00:00 | 0.00 |
| 63 | ore separation comprehensive refined yield (wet weight) | 2017-07-04 15:00:00 | 0.00 |
| 64 | ore separation comprehensive refined yield (wet weight) | 2017-07-04 16:00:00 | 0.00 |
| 65 | ore separation comprehensive refined yield (wet weight) | 2017-07-04 17:00:00 | 0.00 |
| 66 | ore separation comprehensive refined yield (wet weight) | 2017-07-04 18:00:00 | 0.00 |
| 67 | ore separation comprehensive refined yield (wet weight) | 2017-07-04 19:00:00 | 167.00 |
| 68 | ore separation comprehensive refined yield (wet weight) | 2017-07-04 20:00:00 | 16.00 |
| 69 | ore separation comprehensive refined yield (wet weight) | 2017-07-04 21:00:00 | 64.00 |
| 70 | ore separation comprehensive refined yield (wet weight) | 2017-07-04 22:00:00 | 339.00 |
| 71 | ore separation comprehensive refined yield (wet weight) | 2017-07-04 23:00:00 | 336.00 |
| 72 | ore separation comprehensive refined yield (wet weight) | 2017-07-05 00:00:00 | 330.00 |

The embodiment illustrates a one-dimensional pattern matching manner by taking comprehensive massive ore ratio indexes as an example. For time sequence selection of one-dimensional pattern matching, historical data History[i] is set as historical data of the comprehensive refined yield (wet weight) in 3 days, i is a time sequence value and meets $0 \leq i \leq 72$, the time sequence to be matched is Query[j] and is a time sequence selected from the historical data through screening operations, the length of the time sequence is Range=6 and meets Range=QueryMax−QueryMin, and QueryMin and QueryMax are respectively the starting point and the termination point of the time sequence to be matched, wherein 0≤j<6. The selected time sequence is eliminated from the historical data so as to conveniently match similar time sequence data from the remaining historical data, and the length of the remaining time sequence is History.length−Range=66.

During data pool updating, if pattern matching is performed twice and 2 groups of similar time sequence data is obtained, History.length=History.length−(n+1)*Range=72−(2+1)*6=54, which means that the length of a data pool performing pattern matching of time sequence data next time is 54.

During Hough transformation, an X axis voting proportional scale Xscale takes 0.25, and a Y axis voting proportional scale Yscale takes 0.25.

Figure 2A:
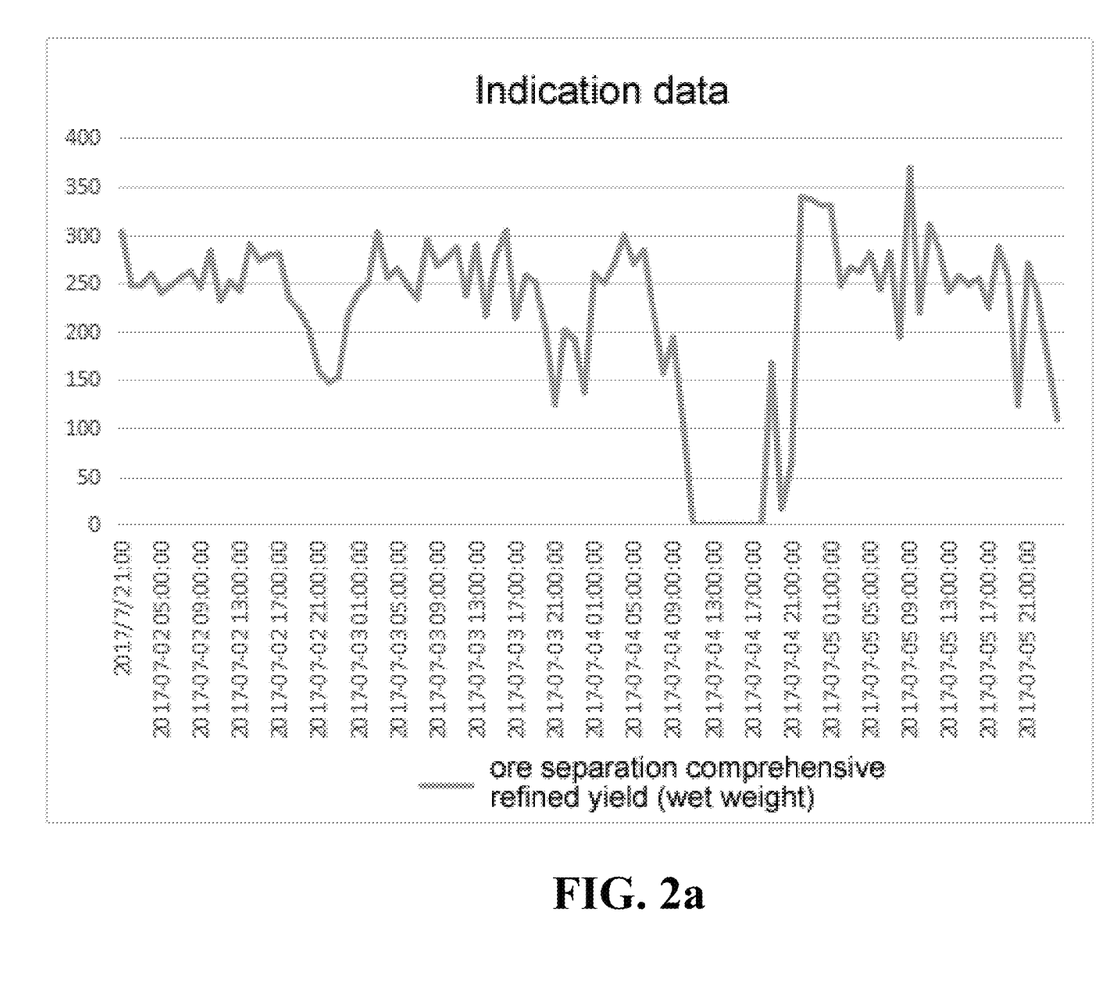
FIG. 2a is a distribution diagram of one-dimensional time sequence data.
Figure 2B:
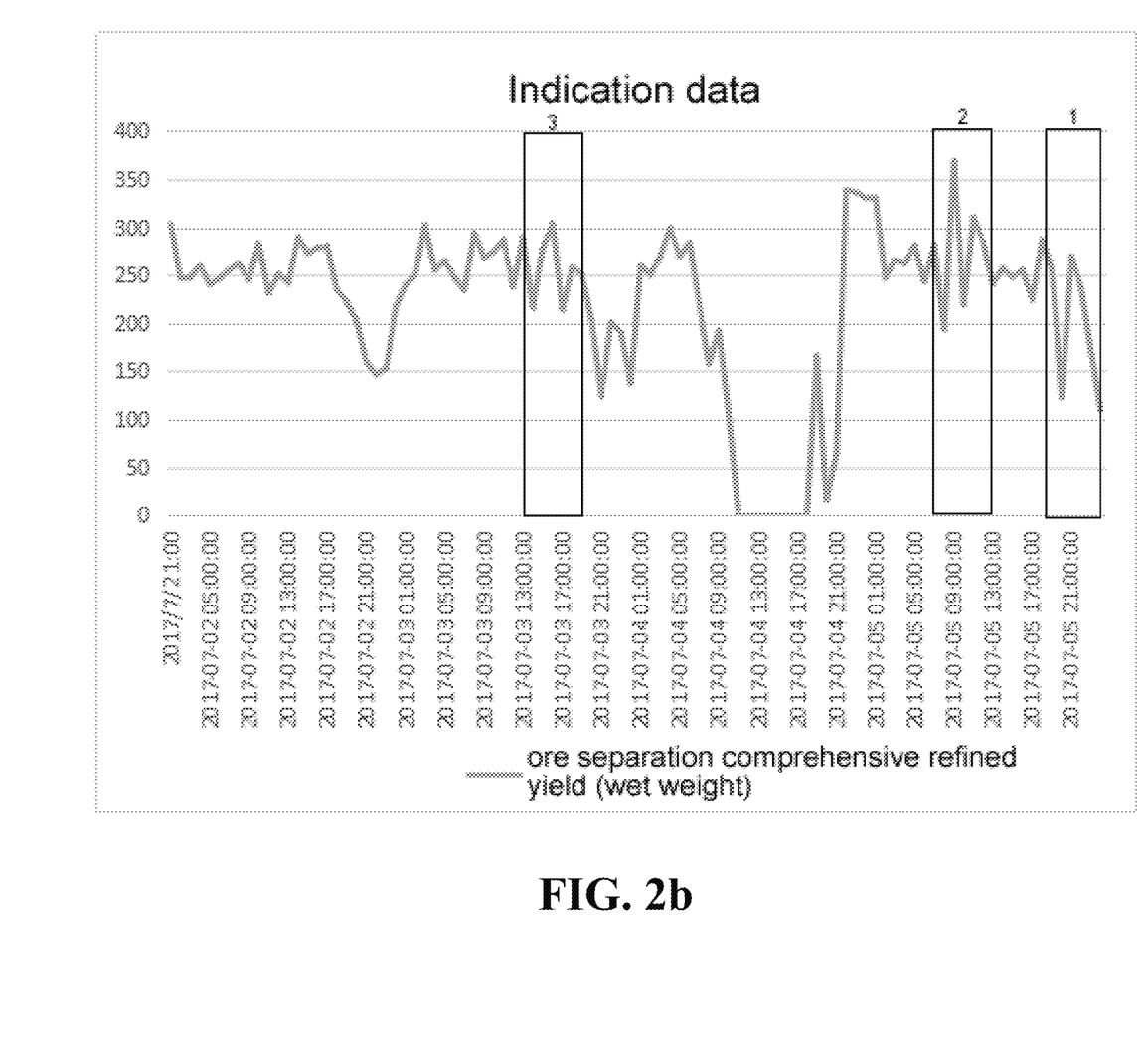
FIG. 2b is a matching effect diagram after one-dimensional time sequence pattern matching is performed.

The final one-dimensional time sequence pattern matching result of the embodiment is as shown in FIG. 2, and the figure shows the effect diagram of 2 pieces of similar one-dimensional data 2, 3 matched according to the selected inquired one-dimensional data 1.

Embodiment II

Relative to historical data of a one-dimensional time sequence pattern matching method, historical data of a multi-dimensional time sequence pattern matching method changes, and one-dimensional data is converted into multi-dimensional data. The embodiment illustrates a visualized multi-dimensional time sequence matching method based on Hough transformation by taking ore separation comprehensive refined wet weight yield indexes, comprehensive massive ore ratio indexes, powder 2# indexes and finished product −2# ore quantity indexes in ore separation production process of ore separation enterprises, in Table 2, as examples.

TABLE 2

Multi-dimensional index data table

| | | Powder 2# | | Finished product −2# ore quantity | |
|---|---|---|---|---|---|
| ID | Sampling time | Raw data | Normalized data | Raw data | Normalized data |
| 1 | 2017/7/2 1:00 | 282.95 | 0.51 | 204.04 | 0.83 |
| 2 | 2017-07-02 02:00:00 | 424.90 | 0.76 | 176.60 | 0.69 |
| 3 | 2017-07-02 03:00:00 | 344.63 | 0.62 | 196.14 | 0.79 |
| 4 | 2017-07-02 04:00:00 | 291.48 | 0.52 | 200.16 | 0.81 |
| 5 | 2017-07-02 05:00:00 | 26.01 | 0.05 | 180.33 | 0.71 |
| 6 | 2017-07-02 06:00:00 | 5.11 | 0.01 | 224.42 | 0.93 |
| 7 | 2017-07-02 07:00:00 | 219.46 | 0.39 | 160.02 | 0.61 |
| 8 | 2017-07-02 08:00:00 | 146.32 | 0.26 | 214.38 | 0.88 |
| 9 | 2017-07-02 09:00:00 | 0.88 | 0.00 | 156.44 | 0.59 |
| 10 | 2017-07-02 10:00:00 | 508.69 | 0.91 | 172.24 | 0.67 |
| 11 | 2017-07-02 11:00:00 | 558.75 | 1.00 | 161.69 | 0.62 |
| 12 | 2017-07-02 12:00:00 | 530.15 | 0.95 | 89.96 | 0.26 |
| 13 | 2017-07-02 13:00:00 | 258.68 | 0.46 | 231.29 | 0.97 |
| 14 | 2017-07-02 14:00:00 | 0.00 | 0.00 | 138.22 | 0.50 |
| 15 | 2017-07-02 15:00:00 | 0.00 | 0.00 | 195.07 | 0.79 |
| 16 | 2017-07-02 16:00:00 | 14.10 | 0.03 | 196.82 | 0.80 |
| 17 | 2017-07-02 17:00:00 | 350.88 | 0.63 | 178.26 | 0.70 |
| 18 | 2017-07-02 18:00:00 | 521.25 | 0.93 | 201.30 | 0.82 |
| 19 | 2017-07-02 19:00:00 | 162.65 | 0.29 | 179.33 | 0.71 |
| 20 | 2017-07-02 20:00:00 | 0.00 | 0.00 | 164.64 | 0.63 |
| 21 | 2017-07-02 21:00:00 | 48.28 | 0.09 | 160.22 | 0.61 |
| 22 | 2017-07-02 22:00:00 | 559.00 | 1.00 | 192.93 | 0.78 |
| 23 | 2017-07-02 23:00:00 | 228.15 | 0.41 | 162.56 | 0.62 |
| 24 | 2017-07-03 00:00:00 | 0.04 | 0.00 | 189.66 | 0.76 |
| 25 | 2017-07-03 01:00:00 | 296.72 | 0.53 | 191.15 | 0.77 |
| 26 | 2017-07-03 02:00:00 | 406.92 | 0.73 | 195.53 | 0.79 |
| 27 | 2017-07-03 03:00:00 | 459.58 | 0.82 | 201.41 | 0.82 |
| 28 | 2017-07-03 04:00:00 | 2.60 | 0.00 | 232.45 | 0.97 |
| 29 | 2017-07-03 05:00:00 | 134.41 | 0.24 | 225.86 | 0.94 |
| 30 | 2017-07-03 06:00:00 | 318.07 | 0.57 | 213.56 | 0.88 |
| 31 | 2017-07-03 07:00:00 | 53.83 | 0.10 | 214.60 | 0.88 |
| 32 | 2017-07-03 08:00:00 | 0.00 | 0.00 | 157.69 | 0.60 |
| 33 | 2017-07-03 09:00:00 | 122.22 | 0.22 | 170.69 | 0.66 |
| 34 | 2017-07-03 10:00:00 | 447.55 | 0.80 | 183.23 | 0.73 |
| 35 | 2017-07-03 11:00:00 | 457.58 | 0.82 | 201.14 | 0.82 |
| 36 | 2017-07-03 12:00:00 | 489.31 | 0.88 | 171.90 | 0.67 |
| 37 | 2017-07-03 13:00:00 | 227.61 | 0.41 | 205.96 | 0.84 |
| 38 | 2017-07-03 14:00:00 | 0.00 | 0.00 | 199.84 | 0.81 |
| 39 | 2017-07-03 15:00:00 | 0.00 | 0.00 | 186.29 | 0.74 |
| 40 | 2017-07-03 16:00:00 | 0.00 | 0.00 | 224.50 | 0.93 |
| 41 | 2017-07-03 17:00:00 | 306.57 | 0.55 | 195.90 | 0.79 |
| 42 | 2017-07-03 18:00:00 | 374.34 | 0.67 | 179.66 | 0.71 |
| 43 | 2017-07-03 19:00:00 | 291.61 | 0.52 | 167.70 | 0.65 |
| 44 | 2017-07-03 20:00:00 | 0.00 | 0.00 | 160.35 | 0.61 |
| 45 | 2017-07-03 21:00:00 | 30.68 | 0.05 | 140.20 | 0.51 |
| 46 | 2017-07-03 22:00:00 | 457.02 | 0.82 | 176.02 | 0.69 |
| 47 | 2017-07-03 23:00:00 | 407.15 | 0.73 | 166.22 | 0.64 |
| 48 | 2017-07-04 00:00:00 | 0.01 | 0.00 | 179.77 | 0.71 |
| 49 | 2017-07-04 01:00:00 | 397.02 | 0.71 | 190.11 | 0.76 |
| 50 | 2017-07-04 02:00:00 | 414.37 | 0.74 | 182.92 | 0.73 |
| 51 | 2017-07-04 03:00:00 | 394.51 | 0.71 | 183.05 | 0.73 |
| 52 | 2017-07-04 04:00:00 | 406.07 | 0.73 | 179.48 | 0.71 |
| 53 | 2017-07-04 05:00:00 | 250.08 | 0.45 | 220.00 | 0.91 |
| 54 | 2017-07-04 06:00:00 | 0.00 | 0.00 | 202.21 | 0.82 |
| 55 | 2017-07-04 07:00:00 | 0.00 | 0.00 | 202.24 | 0.82 |
| 56 | 2017-07-04 08:00:00 | 6.93 | 0.01 | 181.45 | 0.72 |
| 57 | 2017-07-04 09:00:00 | 353.13 | 0.63 | 129.78 | 0.46 |
| 58 | 2017-07-04 10:00:00 | 338.91 | 0.61 | 161.78 | 0.62 |
| 59 | 2017-07-04 11:00:00 | 390.05 | 0.70 | 137.05 | 0.50 |
| 60 | 2017-07-04 12:00:00 | 82.78 | 0.15 | 151.72 | 0.57 |
| 61 | 2017-07-04 13:00:00 | 0.02 | 0.00 | 38.13 | 0.00 |
| 62 | 2017-07-04 14:00:00 | 0.00 | 0.00 | 186.03 | 0.74 |
| 63 | 2017-07-04 15:00:00 | 0.00 | 0.00 | 185.78 | 0.74 |
| 64 | 2017-07-04 16:00:00 | 0.00 | 0.00 | 237.67 | 1.00 |
| 65 | 2017-07-04 17:00:00 | 131.27 | 0.23 | 157.69 | 0.60 |
| 66 | 2017-07-04 18:00:00 | 288.58 | 0.52 | 159.82 | 0.61 |
| 67 | 2017-07-04 19:00:00 | 299.99 | 0.54 | 44.76 | 0.03 |
| 68 | 2017-07-04 20:00:00 | 90.14 | 0.16 | 94.61 | 0.28 |
| 69 | 2017-07-04 21:00:00 | 0.00 | 0.00 | 105.57 | 0.34 |
| 70 | 2017-07-04 22:00:00 | 181.47 | 0.32 | 73.90 | 0.18 |
| 71 | 2017-07-04 23:00:00 | 47.75 | 0.09 | 83.76 | 0.23 |
| 72 | 2017-07-05 00:00:00 | 0.00 | 0.00 | 95.16 | 0.29 |

According to a multi-dimensional pattern matching method, firstly index data is subjected to normalization processing, and a normalization method adopted in the embodiment lies in that:

$$x' = \frac{x - x(\min)}{x(\max) - x(\min)}.$$

Powder 2# indexes are taken as an example, for example, for the time sequence consisting of 24 data points screened out from data on Jul. 2, 2017 original data is {282.95, 424.90, 344.63, 291.48, 26.01, 5.11, 219.46, 146.32, 0.88, 508.69, 558.75, 530.15, 258.68, 0.00, 0.00, 14.10, 350.88, 521.25, 162.65, 0.00, 48.28, 559.00, 228.15, 0.04}, and normalized data is {0.51, 0.76, 0.62, 0.52, 0.05, 0.01, 0.39, 0.26, 0.00, 0.91, 1.00, 0.95, 0.46, 0.00, 0.00, 0.03, 0.63, 0.93, 0.29, 0.00, 0.09, 1.00, 0.41, 0.00};

For time sequence selection of multi-dimensional pattern matching, historical data History[dim][i] is set as data after normalization of historical data of ore separation comprehensive refined wet weight yield indexes, comprehensive massive ore ratio indexes, powder 2# indexes and finished product −2# ore quantity indexes in 3 days, i is a time sequence value and meets 0≤i≤72, the time sequence to be matched is Query[dim][j] and is a time sequence selected from the historical data through screening operations, the length of the time sequence is Range=6 and meets Range=QueryMax−QueryMin, and QueryMin and QueryMax are respectively the starting point and the termination point of the time sequence to be matched, wherein 0≤j<6, dim=4. The selected time sequence is eliminated from the historical data so as to conveniently match similar time sequence data from the remaining historical data, and the length of the remaining time sequence is History[0].length−Range=66.

During data pool updating, if pattern matching is performed twice and 2 groups of similar time sequence data is obtained, History[0].length=History[0].length−(n+1)*Range=72−(2+1)*6=54, which means that the length of a data pool performing pattern matching of time sequence data next time is 54.

During Hough transformation, an X axis voting proportional scale Xscale is 2, a Y axis voting proportional scale Yscale is 2, and historical data dimension is K=4.

Figure 3A:
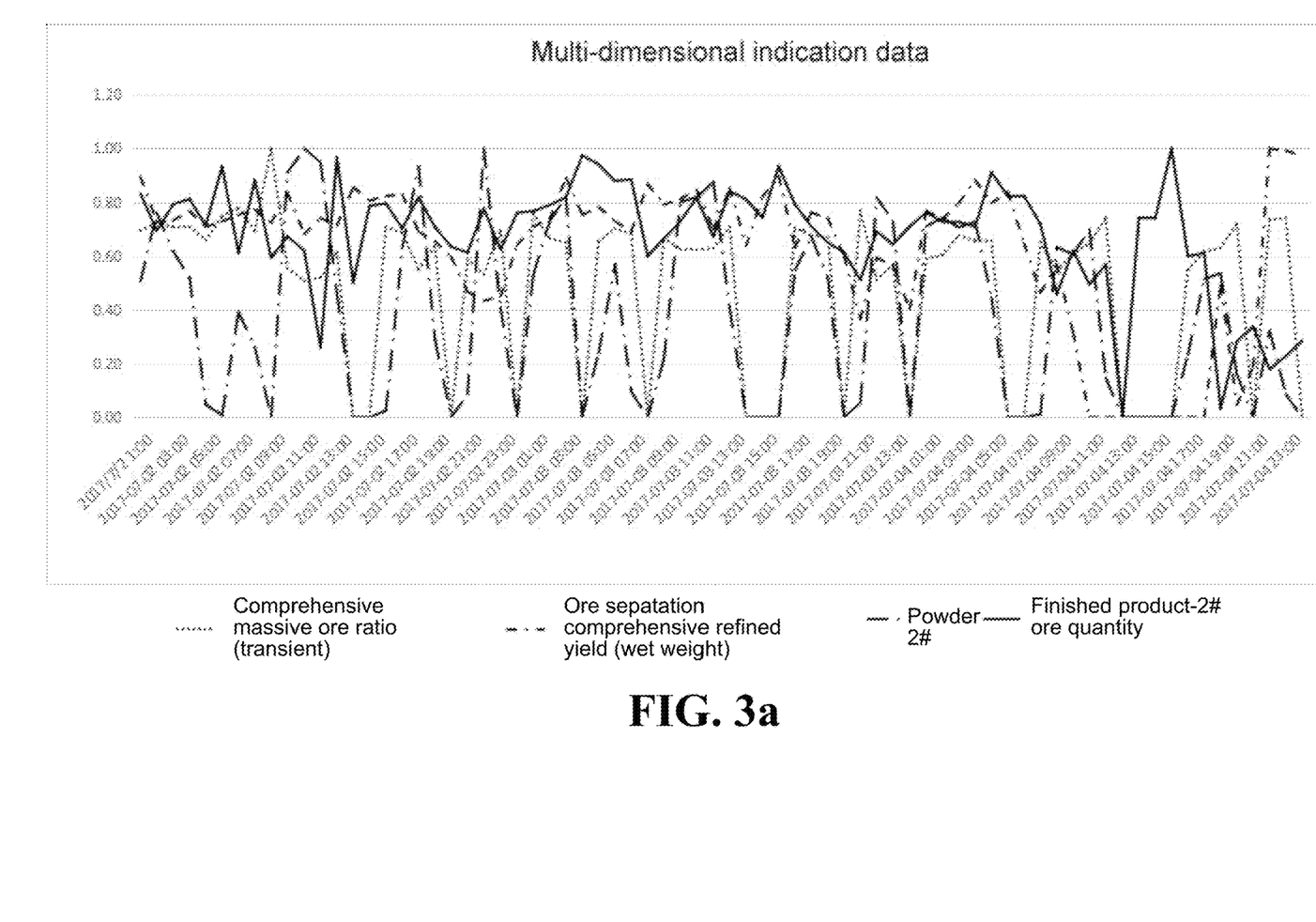
FIG. 3a is a distribution diagram of multi-dimensional time sequence data.
Figure 3B:
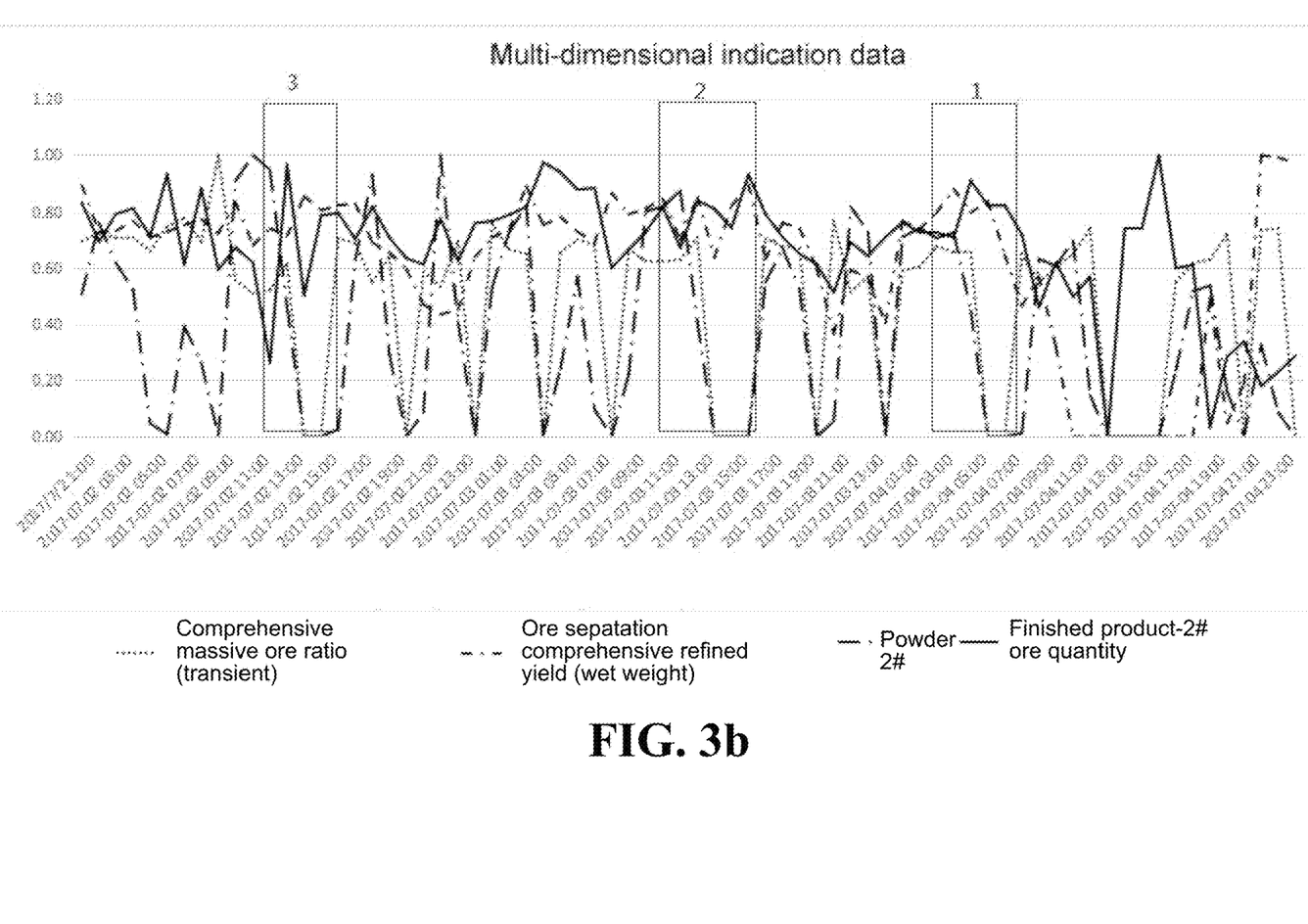
FIG. 3b is a matching effect diagram after multi-dimensional time sequence pattern matching is performed.

The final multi-dimensional time sequence pattern matching result of the embodiment is as shown in FIG. 3, and the figure shows the effect diagram of 2 pieces of similar multi-dimensional data 2, 3 matched according to the selected inquired multi-dimensional data 1.

Finally, it should be noted that the above embodiments are only used to illustrate the technical solution of the invention, not to limit it; although the invention has been described in detail with reference to the foregoing embodiments, it should be understood by those skilled in the art that these technical solutions described in the foregoing embodiments may be modified or some or all of its technical features equivalently may be substituted; however, these modifications or substitutions do not cause the essence of the corresponding technical solution to depart from the scope defined by the claims of the invention.

What is claimed is:

1. A visualized time sequence pattern matching method for data visualization analysis based on Hough transformation, comprising the following steps:
step 1, judging whether historical data to be matched is one-dimensional time sequence data or multi-dimensional time sequence data, if the historical data to be matched is the one-dimensional time sequence data, directly performing step 2, if the historical data to be matched is the multi-dimensional time sequence data, performing normalization processing on the time sequence data, and then performing the step 2;
step 2, performing time sequence selection: selecting a time sequence to be matched from the historical data in a time window pattern, and eliminating the selected time sequence from the historical data so as to conveniently match similar time sequence data from the remaining historical data;
step 3, converting a time sequence image in original coordinates to a Hough space through the Hough transformation, and judging a similarity matching situation of the time sequence through a voting mechanism,
wherein the step 3 comprises three parts: data pool updating, projection of XY axes to the Hough space, and voting based on the voting mechanism; and
step 4, performing screening: finding out a most similar group of time sequences according to the voting result, outputting to obtain positions of the time sequences in the historical data, deleting the time sequences from the positions of the time sequences in the historical data, enabling the similar time sequence data to be added with 1, and from the step 3, performing a next-round voting calculation until matching of all the historical data is completed.

2. The method according to claim 1, wherein a specific method of the step 2 comprises the following steps:
if the historical data is one-dimensional time sequence data History[i], i is a time sequence value and meets 0≤i≤History.length−1, History.length is a length of the historical data, the selected time sequence to be matched is Query[j], a length of the selected time sequence to be matched is Range, 0≤j<Range and Range=QueryMax−QueryMin, and QueryMax and QueryMin are respectively a termination point and a starting point of the time sequence to be matched, after the selected matched time sequence is eliminated from the historical data, the length of the remaining time sequence is History.length−Range; and
if the historical data is multi-dimensional time sequence data History'[dim][i], dim is different dimension indexes, i is a time sequence value, History'[0].length is a length of zero-dimensional historical data and meets 0≤i≤History'[0].length−1, the time sequence to be matched is Query'[dim][j], a length of the time sequence to be matched is Range, 0≤j<Range and Range=QueryMax−QueryMin, and QueryMax and QueryMin are respectively a termination point and a starting point of the time sequence to be matched, after the selected matched time sequence is eliminated from the historical data, the length of the remaining time sequence is History'[0].length−Range.

3. The method according to claim 2, wherein a specific method of the data pool updating in the step 3 comprises the following steps:
when a time sequence having similar data with the time sequence to be matched is matched in the historical data, the matched time sequence is eliminated from the historical data so as to realize the data pool updating,
wherein if the historical data is the one-dimensional time sequence data, when an n-th similar time sequence is matched, the length of the remaining time sequence in the historical data is as shown in the following formula:

History.length=History.length−(n+1)*Range, and if the historical data is the multi-dimensional time sequence data, when an n-th similar time sequence is matched, the length of the remaining time sequence in the historical data is as shown in the following formula:

History'[dim].length=History'[dim].length−(n+1)*Range.

4. The method according to claim 3, wherein a specific method of the projection of the XY axes to the Hough space and voting based on the voting mechanism in the step 3 comprises the following steps:
step C1, finding out an X axis starting point StartSearch of the historical data to be matched this time, setting t=StartSearch, and determining a termination point EndSearch of the historical data to be matched this time;

step C2, setting m=QueryMin; and step C3, projecting an X axis of the historical data to the Hough space, wherein if the historical data is the one-dimensional time sequence data, a projection formula is as follows:

hx=Math.floor{[History[t].time+Range/2−(m−QueryMin)]*Xscale}, hx is an X coordinate projected to the Hough space, Xscale is an X axis voting proportional scale, and Math.floor is a rounding down calculation, and if the historical data is the multi-dimensional time sequence data, a projection formula is as follows:

hx=Math.floor{[History[0][t].time+Range/2−(m−QueryMin)]*Xscale};

step C4, projecting a Y axis of the historical data to the Hough space, and needing to figure out a difference value between a data to be matched and the historical data for unit Y axis projection, wherein if the historical data is the one-dimensional time sequence data, a projection formula is as follows:

hy=Math.floor{[Query[m−QueryMin].value−History[t].value]*Yscale}, wherein Yscale is a Y axis voting proportional scale, hy is a Y coordinate projected to the Hough space, Query[m−QueryMin].value is a value of a one-dimensional time sequence at time m−QueryMin, and History[t].value is a value of a one-dimensional historical time sequence at time t, and if the historical data is the multi-dimensional time sequence data, a projection formula is as follows:

$$hy = \text{Math.floor}\left\{\left[\sum_{dim=1}^{K} \text{Query}[dim][m - QueryMin].\text{value} - \sum_{dim=1}^{K} \text{History}[dim][t].\text{value}\right] * Yscale\right\},$$

wherein K is a historical data dimension;

step C5, performing voting to obtain a corresponding time sequence when a largest number of votes under [hx][hy] coordinates is obtained;

step C6, m++, re-performing steps C3-C5, until m=QueryMax; and step C7, t++, re-performing steps C2-C6, until t=EndSearch.

5. The method according to claim 4, wherein a specific method of the step C5 comprises the following steps:

step C5.1, setting a voting principle: giving one vote under the condition of a same X axis difference value and a same Y axis difference value, namely, Vote[hx][hy]++, wherein Vote is a number of votes obtained under the [hx][hy] coordinates; and step C5.2, if a count of votes obtained under the [hx][hy] coordinates is MMax<Vote[hx][hy], enabling:

MMax=Vote[hx][hy], MMaxT=History[t].time,

Wherein MMax is the count of votes obtained under the [hx][hy] coordinates, MMaxT is a corresponding time sequence when the number of votes MMax is obtained.

* * * * *